United States Patent
Kung

Patent Number: 5,265,159
Date of Patent: Nov. 23, 1993

[54] SECURE FILE ERASURE

[75] Inventor: Kenneth C. Kung, Cerritos, Calif.

[73] Assignee: Hughes Aircraft Company, Los Angeles, Calif.

[21] Appl. No.: 902,607

[22] Filed: Jun. 23, 1992

[51] Int. Cl.$^5$ .............................................. H04L 9/00
[52] U.S. Cl. ............................................................ 380/4
[58] Field of Search ............................................... 380/4

[56] References Cited

U.S. PATENT DOCUMENTS

| | | | |
|---|---|---|---|
| 4,634,807 | 1/1987 | Chorley et al. | 380/4 |
| 4,937,861 | 6/1990 | Cummins | 380/4 |
| 5,063,596 | 11/1991 | Dyke | 380/4 |

*Primary Examiner*—David C. Cain
*Attorney, Agent, or Firm*—Wanda K. Denson-Low

[57] ABSTRACT

A method of securely deleting a file on a storage medium of a computer system so that it is not readable, wherein an encryption algorithm is used to encrypt the data in the stored file prior to a conventional deletion process. The present invention permits a user to erase files from a permanent storage space and in a manner that makes the file totally unreadable by others. When a user requests deletion of a stored file, the file is encrypted so that it is not readable. The user has an option to undelete the file by decrypting the file as long as this operation is done before the storage space is used by another program. When the secure deletion method is used, no utility program can recover any information from the deleted file. To an intruder, the storage space is encrypted to look like random bits. Therefore, no information can be retrieved nor derived from the encrypted, deleted file. If the user does not expect to undelete the information, a one-way encryption algorithm is used to increase the speed of secure deletion of the file. If the user does not destroy the key, he or she may recover the file. This method restores the file directory pointer to the file, and decrypts the encrypted stored file using the random key to permit access to the data contained in the stored file.

3 Claims, 1 Drawing Sheet

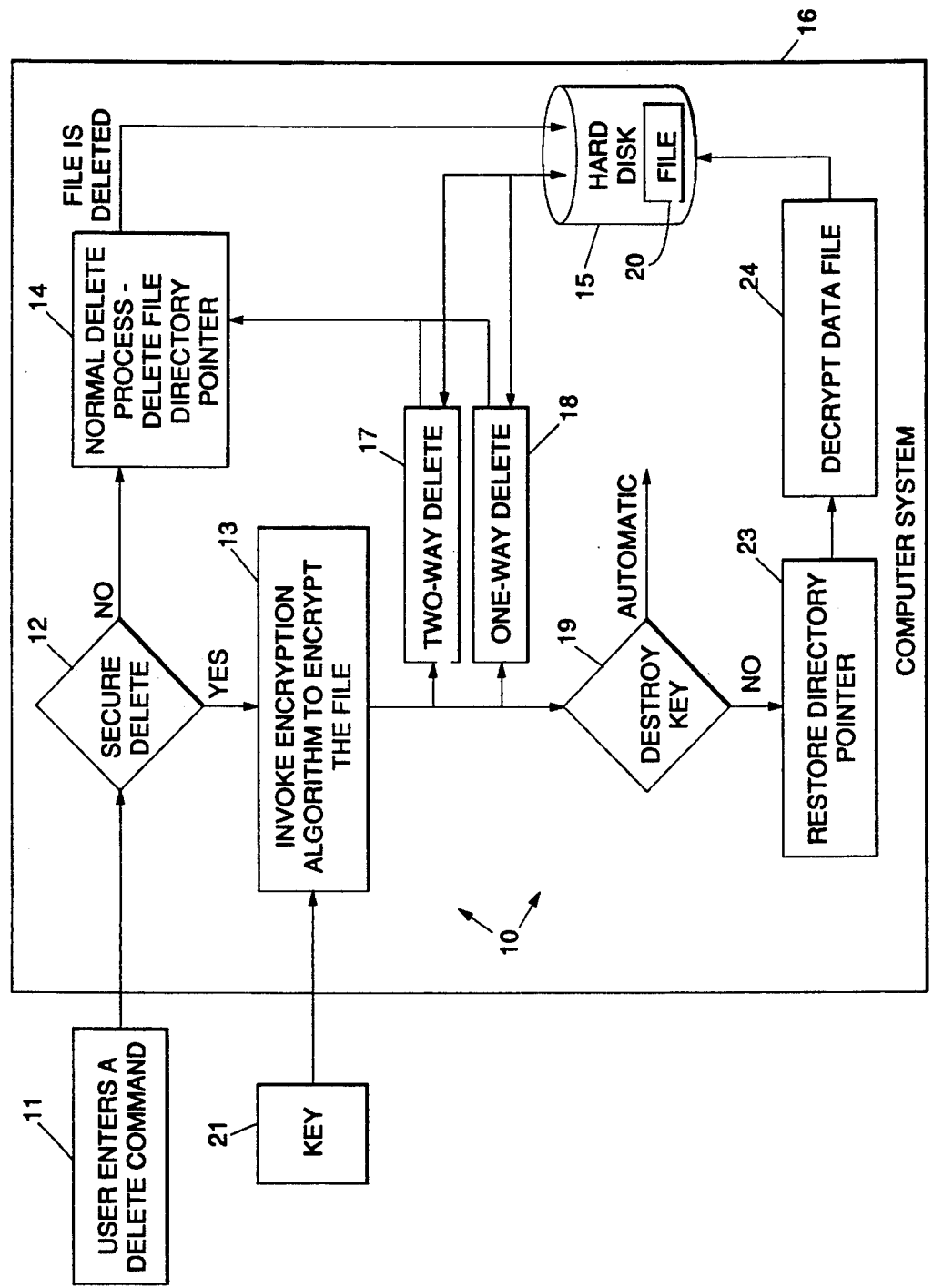

SECURE FILE ERASURE

BACKGROUND

The present invention relates generally to computer systems, and more particularly, to methods of deleting (erasing) files stored on permanent storage media of a computer system that eliminates the possibility of recovery of the data as a readable file by unauthorized persons.

A traditional method for deleting a file from permanent storage space (a hard disk, for example) is to delete the pointer contained in the file directory that points to the information blocks comprising the file. The actual contents of the information is left untouched. Using a utility program, the contents of every block of storage space can be scanned for sensitive information.

More particularly, although storage space is freed up for other uses, the file's data content is left untouched until the storage space is actually used for another file storage. This is inherently dangerous because the user believes the data is gone, yet a skilled intruder can use powerful utility tools to scan for these deleted files.

Another conventional method of file deletion requires a user to overwrite 0's and 1's over the entire data file as to remove any magnetic remnants of the removed information. This method is slow because the system must write 0's and 1's many times to ensure that the stored information cannot be recovered.

It is therefore an objective of the present invention to provide a method for deleting files stored on permanent storage media. It is a further objective to provide for a file deletion method whereby files are permanently deleted without the possibility of recovery. It is a further objective to provide for a file deletion method whereby files are deleted in a manner that does not permit recovery by a person other than the original user or someone authorized by the user, and thus permits recovery of the deleted file.

SUMMARY OF THE INVENTION

In order to provide for the above and other objectives and features, the present invention provides for a method wherein an encryption algorithm is used to encrypt the data in a stored file when deleting the file. The encryption algorithm, such as a Type I or Type II encryption algorithm employed in a Secure Data Network Protocol (SDNP) processor manufactured by the assignee of the present invention, may be employed during file erasure to eliminate the weaknesses mentioned with regard to the conventional file erasure methods. The SDNP processor includes an integrated circuit chip that incorporates a selected one of the NSA-developed encryption algorithms. The Type 1 algorithm allows encryption of files containing classified information, and has a level of encryption that permits the encrypted files to be transferred to others without risk of exposure of the data contained in the files. The Type II algorithm is similar to the Type I algorithm but has been developed for nonclassified but sensitive data.

In accordance with the present invention, when a user requests deletion of a stored file, the file is encrypted so that it is not readable. The erasure is performed by using the encryption algorithm so that the contents of the file cannot be retrieved by other users after the erasure. Both one way and two way file deletion may be employed. In the one way deletion mode, if the user does not expect to "undelete" the data, a one-way encryption algorithm is used to increase the speed of secure deletion of the file. In the two way deletion mode, the user has the option to undelete the file by decrypting the encrypted file or disk storage area where the deleted file is stored, as long at this operation is done before the storage space is used by other software programs.

When the secure deletion method of the present invention is used, no utility program can recover any information from the deleted file. To an intruder, the storage space is encrypted to look like random bits. Therefore, no information can be retrieved nor derived from the encrypted, deleted file.

The present invention provides an enhancement for the existing file deletion function of the operating system any computer system so that if a user wants to securely delete the contents of a particular file, the file will be unreadable by anyone else. Using the present file deletion scheme employing the encryption algorithm when deleting data files eliminates the vulnerability present in conventional file deletion methods. The present invention thus permits a user to erase files from a permanent storage space (a hard or floppy disk, for example) and in a manner that makes the file totally unreadable by others.

The present invention also comprises a method of processing a file stored on a permanent storage medium of a computer system that eliminate access to the file by unauthorized persons. The method comprises selecting a stored file, encrypting the stored file using a random key, and then deleting a file directory pointer to the data file. The random key is stored externally and is in possession of the authorized user of the computer system. To recover the data, the method restores the file directory pointer to the data file, and decrypts the encrypted stored file using the same random, externally stored, key used to encrypt the file to permit access to the data contained in the stored file.

BRIEF DESCRIPTION OF THE DRAWINGS

The various features and advantages of the present invention may be more readily understood with reference to the following detailed description taken in conjunction with the accompanying drawing, and in which the sole FIGURE illustrates a method in accordance with the principles of the present invention that securely deletes a file stored on a storage medium of a computer system.

DETAILED DESCRIPTION

Referring to the drawing FIGURE, it illustrates a secure file erasure method 10 in accordance with the principles of the present invention that securely and permanently deletes a file 20 stored on a storage medium 15 of a computer system 16. The computer system 16 includes a hard disk employed as the storage medium 15, and has a keyboard or mouse device (not shown) to provide inputs to the computer system 16. The computer system 16 includes an operating system that contains a conventional delete file command as one of its functions. The delete file command is employed to delete files 20 stored on the storage medium 15.

In accordance with the principles of the present invention, if a user of the computer system 16 desires to delete the file 20 stored on the storage medium 15, the user enters a delete file commend 11 by selecting from a menu on a computer screen (not shown) or by typing a delete file command sequence on the keyboard. A firmware processing routine in accordance with the principles of the present invention that is stored in a ROM or as an application program that runs on the computer system 10 intercepts the delete file command and prompts the user on the display screen 17 if a secure deletion of the stored file 20 is desired, illustrated by decision block 12. If no secure file deletion is desired, then the method 10 of the present invention proceeds to a normal delete file process 14. This normal delete file process may be a traditional file deletion process described in the Background section, wherein a pointer contained in the file directory of the storage medium 15 that points to the information blocks comprising the file 20 is deleted. In this situation, the actual contents of the information in the file 20 is left untouched.

If, however, a secure deletion of the file 20 is desired, then an encryption algorithm 13 is used to encrypt the file 20 whose contents is to be deleted. The encryption algorithm 13 may comprise a Type I or Type II algorithm employed in a Secure Data Network Protocol processor developed by the assignee of the present invention. This algorithm is incorporated in an integrated circuit chip that may be purchased from the National Security Administration (NSA). The chip is incorporated in a Secure Data Network Protocol (SDNP) processor manufactured by the assignee of the present invention, which may be employed for the purposes of encryption of the file 20. Once the file 20 has been encrypted by the encryption algorithm 13 the method proceeds to the normal deletion process step 14 which deletes the directory pointer.

The specifics of the encryption algorithm employed in the present method 10 are as follows. Both one way and two way file deletion modes 17, 18 may be employed using the encryption algorithm 13. In the one way deletion mode 17, wherein the user does not expect to "undelete" the data, a one-way encryption algorithm is used to increase the speed of secure deletion of the file 20. In the one way mode 17, the data in the file 20 is encrypted using a random external key 21, and then the key 21 is automatically destroyed 19 and cannot be used to recover the data. Consequently without the key 21, the data cannot be decrypted and is thus unreadable by anyone.

In the two way mode 18, the data in the file 20 is encrypted using the random key 21, but the key 21 is not destroyed 19 and may be used by the user to recover the data. The key 21 is stored or retained by the user in a secure location external to the computer system 16. In the two way deletion mode 18, the user has the option to undelete the file 20 by restoring the directory pointer 23 and decrypting 24 the encrypted file 20 or disk storage area where the deleted file 20 is stored, as long as this operation is done before the storage space is used by other software programs. Consequently, the data cannot be decrypted and is thus unreadable by anyone without the key 21. If the secure file deletion method 10 of the present invention is used, no utility program can recover any information from the deleted file 20. To an intruder, the storage space is encrypted to look like random bits. Therefore, no information can be retrieved nor derived from the encrypted, deleted file 20.

In summary, then, the method 10 of present invention comprises processing the file 20 stored on the permanent storage medium 15 of the computer system 16 which eliminate access to the file by unauthorized persons. The method includes selecting the stored file 20 and entering a delete command 11, encrypting the stored file 20 using a random key 21 and by operating on the file 20 with the encryption algorithm 13, and then deleting 14 a file directory pointer to the file 20. To recover the file 14, the method 10 restores the file directory pointer 23 to the file 20, and decrypts 24 the encrypted stored file 20 using the random key 21 to permit access to the data contained in the stored file 20.

The present invention thus permits a user to erase files 20 from a permanent storage space and in a manner that makes the file totally unreadable by others. The erasure is performed by using the encryption algorithm so that the contents of the file 20 cannot be retrieved after the erasure. This is different from the traditional file erasure method discussed in the Background section where only the file directory information is deleted or the pointer to the file 20 is deleted. In this conventional method storage space is freed up for other uses, the file's data content is left untouched until the storage space is actually used for storage of another file. This is inherently dangerous because the user believes the data is gone, yet a skilled intruder can use powerful utility tools to scan for these deleted files. By using the present file erasure method employing an encryption algorithm when deleting files 20 eliminates this vulnerability.

Thus there has been described new and improved methods of deleting (erasing) files stored on permanent storage media of a computer system that eliminates the possibility of recovery of the data as a readable file by unauthorized persons. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method of deleting a file stored on a permanent storage medium of a computer system under the control of an operating system, said operating system identifying the location of said file by means of a file directory pointer, said method comprising the steps of:

selecting a stored file for deletion;
encrypting the stored file using a random key;
deleting the file director pointer to the stored file.

2. A method of deleting a file stored on a permanent storage medium of a computer system under the control of an operating system, said operating system identifying the location of said file by means of a file directory pointer, said method comprising the steps of:

selecting a stored file for deletion;
encrypting the stored file using a random key;
destroying the random key; and
deleting a file director pointer to the stored file.

3. A method of processing a file stored on a permanent storage medium of a computer system to eliminate access to the file by unauthorized persons, said computer system being under the control of an operating system, said operating system identifying the location of said file by means of a file directory pointer, said method comprising the steps of:

selecting a stored file for deletion;
encrypting the stored file using a random key;
deleting a file director pointer to the stored file at a time prior to overwriting of storage locations of the encrypted data file, restoring the file directory pointer to the stored file; and
decrypting the encrypted stored file using the random key to permit access to the data contained in the stored file.

* * * * *